Aug. 21, 1956 T. FRAY 2,759,278
HANDLE COVER
Filed March 30, 1953
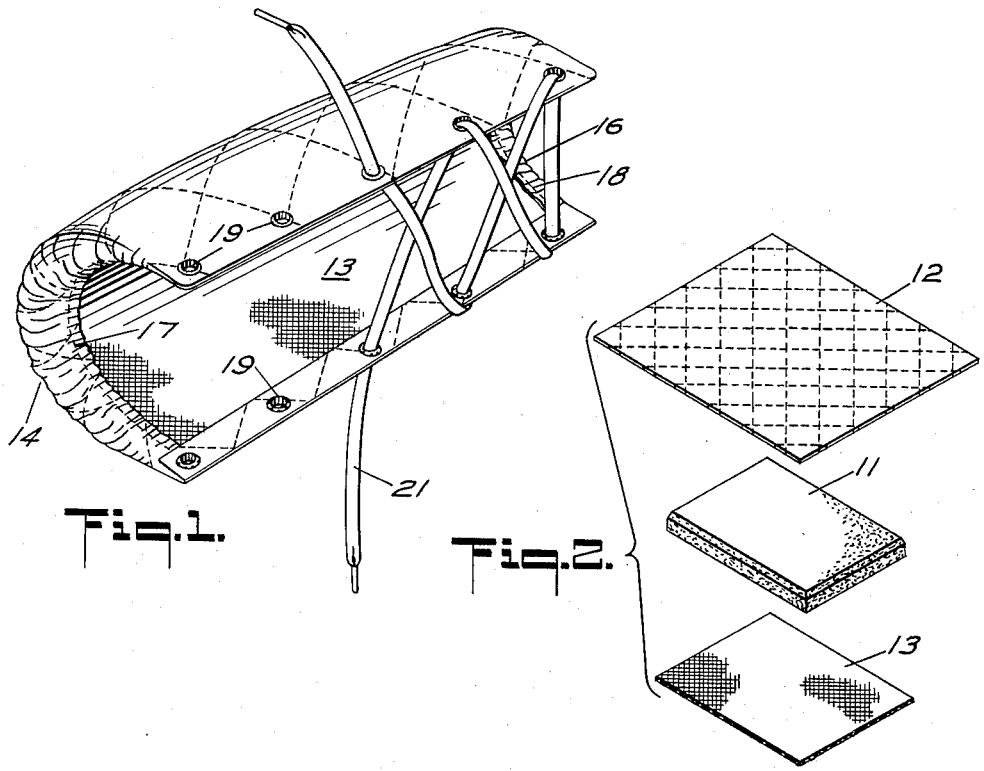
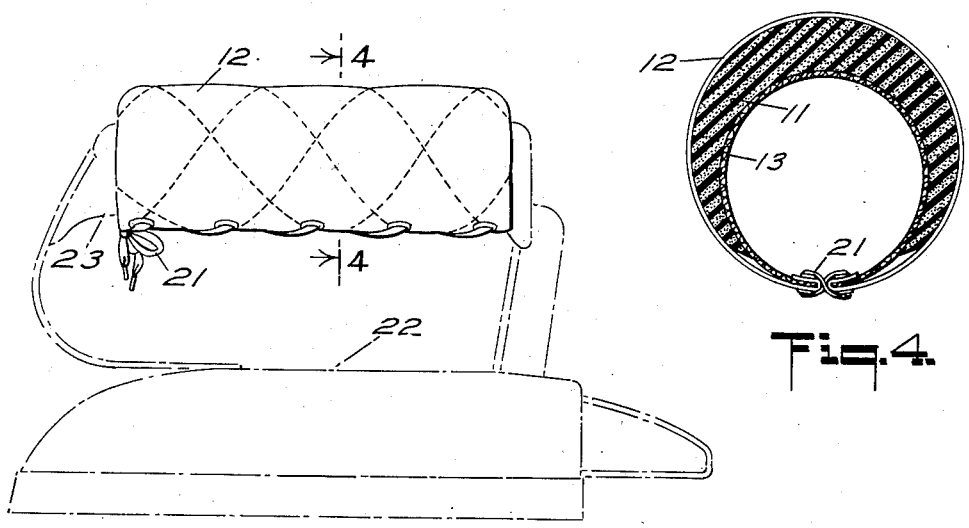
INVENTOR
THELMA FRAY
BY Gardner & Zimmerman
ATTORNEYS United States Patent Office 2,759,278
Patented Aug. 21, 1956

2,759,278

HANDLE COVER

Thelma Fray, San Miguel, Calif.

Application March 30, 1953, Serial No. 345,630

3 Claims. (Cl. 38—95)

The present invention relates to an improved handle cover adapted for removable disposition upon handles and providing a resilient insulated surface for gripping of the handle covered thereby.

The handle cover of the invention may be employed with various types of handles upon almost any kind of equipment, however, the handle cover is particuraly adapted for use with hand irons of the type commonly employed in the home so that in the following description of the invention this illustration is employed.

It is an object of the invention to provide an improved handle cover adapted for removable engagement about a handle.

It is another object of the invention to provide an improved handle cover that includes a resilient member providing a cushion about the handle for easier gripping thereof.

It is a further object of the present invention to provide an improved handle cover having closure means adapting the cover for engagement about handles of various sizes and configurations.

It is a still further object of the present invention to provide an improved cushioned handle cover that is impervious to water and other liquids.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The structural features of a preferred embodiment of the invention are illustrated in the attached drawing wherein:

Figure 1 is a bottom perspective view of the handle cover.

Figure 2 is an exploded view showing certain of the elements of the handle cover.

Figure 3 illustrates the handle cover in engagement with the handle of a hand iron.

Figure 4 is a transverse sectional view taken at 4—4 of Figure 3.

Considering now the structure of the illustrated embodiment of the invention and referring to the drawing, the handle cover will be seen to include three main members which may be designated as a cushion 11, a cover sheet 12, and a liner 13. The cushion 11 is formed of a soft resilient material which is preferably unaffected by water so that the handle cover will not be damaged by water and is thus readily washable. While the cushion 11 could be formed of conventional cushioning material such is generally damaged by immersion so that I employ foam rubber or the like as the material from which cushion 11 is formed. In manufacture cushion 11 may be cut as a rectangle from sheet foam rubber and may advantageously have the upper edges beveled as shown in Figure 2. The cover sheet 12 is also formed as a rectangle with substantially the same width as cushion 11 and a greater length and preferably constitutes a strong lightweight material such as a plastic cloth or the like. An advantageous gripping surface on the handle cover may be obtained by employing a quilted material for cover sheet 12, as shown in Figure 2, whereby the surface thereof is not quite as slick as otherwise, and in this case cover sheet 12 may be formed of a double thickness material that has a central layer of soft material that even further increases the cushioning action of the handle cover. The inner liner 13 may be formed of a strong lightweight material that preferably has a somewhat rough textured surface, such as a light canvas.

The above noted main elements of the invention are assembled in manufacture by placing cushion 11 between cover sheet 12 and inner liner 13 with cover sheet extending in all directions beyond the edges of the cushion and liner. Along the transverse edges 14 and 16 of the handle cover the cover sheet is folded down over the ends of cushion 11 and inner liner 13 and back in lapping relation to the edges of inner liner 13 with seams 17 and 18 being sewn along each of these overlaps for joining together cover sheet 12 and inner liner 13 at the handle cover ends 14 and 16. The longitudinal edges of the handle cover are finished by turning the longitudinal edges of cover sheet back under the edges of inner liner 13 in lapping relation beyond the longitudinal edges of cushion 11. There are provided in these longitudinal lapped edges a plurality of spaced holes or apertures and the cover sheet and inner liner are secured together along each edge by conventional eyelets or grommets 19 which are positioned one in each aperture and which each have one deformable end that may be readily pressed over and outward so that the grommet 19 grips the lapped material about each aperture. Grommets 19 are spaced apart evenly along the longitudinal edges of the handle cover with each grommet clamping two thicknesses of cover sheet 12 and one thickness of inner liner 13, as shown in Figure 4. Preferably the grommets in opposite longitudinal edges of the handle cover are aligned with each other and they may be separated along each edge by one inch, for example.

In addition to the above noted elements and connective members of the handle cover there is further provided a line or tie 21 which has a sufficiently small cross section to fit through grommets 19 and which is preferably provided with rigid ends formed for example by clamping a cylinder of plastic or the like about the line ends and designed to facilitate threading of the line through grommets 19. As shown in Figure 1 line 21 is adapted to be laced through alternate grommets 19 on opposite edges of the handle cover from one end thereof to the other much in the manner of lacing a shoe and by means of which the longitudinal edges of the handle cover may be drawn together over their entire length.

The improved handle cover of the present invention may be readily attached to handles of various sizes and shapes and in the attachment of same to a hand iron 22, for example, as shown in Figure 3, the cover is placed over the iron handle 23 with the inner liner 13 lowermost and resting upon the handle. The transverse edges of the handle cover are then turned downward along the side of the handle, this being readily accomplished as the handle cover includes no rigid members to impair its flexibility. With the handle cover edges extending downward the line 21 is laced through eyelets 19 in the manner of a shoe lace and the line 21 is drawn tight to curl the handle cover edges beneath the iron handle. Line 21 is then secured by tying a conventional knot, such as a bow knot, with the ends thereof so that the handle cover is held snugly in place. As the handle cover is drawn into position about the handle by line 21 the cushion 11 therein deforms as shown in Figure 4 so that the handle cover presents a smooth contour. With handles having finger indentations the lacing formed by line 21 fits in the depressions so that the handle cover is even more firmly secured in position and by use of lacing to connect the handle cover edges sufficient freedom is allowed to adapt the handle cover to a wide range of handle sizes.

It is to be noted that the improved handle cover of the invention may be formed for maximum gripping action on particularly smooth or slippery handles by employing an inner liner having an outer surface with a high coefficient of friction. Alternatively the inner liner may be dispensed with and the cover sheet 12 attached about cushion 11 by including same in the end seams and in the grommet connections, for foam rubber, which is a preferable material for cushion 11, acts to firmly grip the handle surface against which it is pressed. It is also advantageous to curve the handle cover transversely in the manner in which it is to be employed at the time that the end seams 17 and 18 are formed so that the overlapping cover sheet will be gathered across the inner liner at both ends thereof and secured in such position by the seams 17 and 18 to provide a permanent transverse curve in the handle cover for facilitating its installation about a handle.

What is claimed is:

1. An improved handle cover comprising a flexible cushion formed from flat rectangular material and having beveled edge portions, a liner formed from a rectangular piece of strong cloth disposed adjacent the under surface of said cushion and extending beyond same along the the longitudinal edges thereof, a cover sheet formed from a rectangular sheet of material disposed on the top surface of said cushion and extending beyond all of the edges thereof, said cover sheet being turned under the transverse edges of said cushion in overlapping relation to the outer surface of said liner and sewn to said liner along the transverse edges thereof, said cover sheet also being turned under the outer surface of the longitudinal edges of said liner, eyelets formed through the overlapped longitudinal edges of said cover and liner, and a line adapted for lacing through the eyelets of both longitudinal edges of the handle cover for drawing said cushion, said liner and said cover sheet into an arcuate form about a handle to be covered.

2. An improved handle cover comprising a foam rubber cushion, formed from a flat rectangular sheet, an inner liner having a relatively high coefficient of friction disposed contiguous with the under surface of said cushion and extending beyond a first pair of parallel edges thereof, a cover sheet formed of strong flexible material disposed atop said cushion and extending beyond the edges thereof, said cover sheet being folded under said cushion to overlap said liner and being sewn thereto along a second pair of parallel edges of said cushion, a plurality of grommets secured through said cover sheet and liner along each of said first pair of parallel edges, and a line adapted for threading through alternate grommets on opposite edges of the handle cover for drawing same together about a handle and securing same in such position.

3. An improved handle cover as claimed in claim 2 further defined by the joinder of said overlapped cover sheet and liner along said second pair of parallel cushion edges including a seam of thread sewn through said cover sheet and liner along each of said edges with said cover sheet being gathered in said seams whereby said handle cover is convexly curved in a transverse direction for ready engagement with a handle to be covered.

References Cited in the file of this patent
UNITED STATES PATENTS

| | | |
|---|---|---|
| 1,008,604 | Lake | Nov. 14, 1911 |
| 1,637,120 | Larson | July 26, 1927 |
| 2,050,176 | Hammerich | Aug. 4, 1936 |

FOREIGN PATENTS

| | | |
|---|---|---|
| 31,368 | Netherlands | Nov. 15, 1933 |
| 869,662 | France | Nov. 17, 1941 |